(12) United States Patent
Strandjord et al.

(10) Patent No.: US 7,933,020 B1
(45) Date of Patent: Apr. 26, 2011

(54) SYSTEM AND METHOD FOR REDUCING LASER PHASE NOISE IN A RESONATOR FIBER OPTIC GYROSCOPE

(75) Inventors: Lee K. Strandjord, Tonka Bay, MN (US); Tiequn Qiu, Glendale, AZ (US); Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/636,741

(22) Filed: Dec. 13, 2009

Related U.S. Application Data (60) Provisional application No. 61/285,990, filed on Dec. 13, 2009.

(51) Int. Cl.
*G01C 19/72* (2006.01)
(52) U.S. Cl. ..................................... 356/461
(58) Field of Classification Search .................. 356/461, 356/470
See application file for complete search history.

(56) References Cited

U.S. PATENT DOCUMENTS

| | | | |
|---|---|---|---|
| 4,135,822 A | 1/1979 | Ezekiel | |
| 4,352,562 A | 10/1982 | Minden | |
| 4,702,600 A | 10/1987 | Handrich et al. | |
| 4,807,999 A | 2/1989 | Soo Hoo | |
| 4,815,851 A | 3/1989 | Soohoo | |
| 4,863,272 A | 9/1989 | Coccoli | |
| 5,090,810 A | 2/1992 | Malvern | |
| 5,100,236 A | 3/1992 | Hoo et al. | |
| 5,112,128 A | 5/1992 | Soo Hoo et al. | |
| 5,141,315 A | 8/1992 | Malvern | |
| 5,237,387 A | 8/1993 | Sanders | |
| 5,398,111 A | 3/1995 | Cardarelli | |
| 5,420,684 A | 5/1995 | Carroll | |
| 5,465,149 A | 11/1995 | Strandjord et al. | |
| 5,923,424 A | 7/1999 | Sanders et al. | |
| 5,926,275 A | 7/1999 | Sanders et al. | |
| 6,175,410 B1 | 1/2001 | Szafraniec et al. | |
| 6,204,921 B1 | 3/2001 | Strandjord et al. | |
| 6,690,687 B2 | 2/2004 | Ksendzov et al. | |
| 6,765,678 B2 | 7/2004 | Strandjord et al. | |
| 6,778,279 B2 | 8/2004 | Lange et al. | |
| 6,865,317 B2 | 3/2005 | Vahala et al. | |
| 6,885,794 B2 | 4/2005 | Scheuer et al. | |

(Continued)

OTHER PUBLICATIONS

Sanders, "U.S. Appl. No. 61/285,990 Light-Phase-Noise Error Reducer", Filed date: Dec. 13, 2009, Published in: US.

(Continued)

*Primary Examiner* — Patrick J Connolly
(74) *Attorney, Agent, or Firm* — Fogg & Powers LLC (57) ABSTRACT

A resonator gyroscope comprises a reference laser generator to produce a reference light; a first slave light source to produce a first slave light locked to the reference light; a second slave light source to produce a second slave light locked to the reference light; a resonator coupled to said first and second light sources, the resonator having first and second counter-propagating directions and resonance tracking electronics coupled to the Sagnac resonator to generate a first beat frequency based on a first resonance frequency for the first counter-propagating direction, a second beat frequency based on a second resonance frequency for the second counter-propagating direction, and a third beat frequency based on a third resonance frequency for the second counter-propagating direction; wherein the rotational rate of the resonator gyroscope is a function of the first, second and third beat frequencies.

20 Claims, 9 Drawing Sheets

U.S. PATENT DOCUMENTS

| | | | |
|---|---|---|---|
| 7,034,946 B2 | 4/2006 | Chen et al. | |
| 7,065,276 B2 | 6/2006 | Scheuer et al. | |
| 7,149,381 B2 | 12/2006 | Margalit et al. | |
| 7,327,460 B2 * | 2/2008 | Sanders et al. | 356/461 |
| 7,362,443 B2 | 4/2008 | Sanders et al. | |
| 7,372,574 B2 * | 5/2008 | Sanders et al. | 356/461 |
| 7,463,360 B2 * | 12/2008 | Hughes et al. | 356/461 |
| 7,515,272 B2 | 4/2009 | Strandjord et al. | |
| 7,522,284 B2 | 4/2009 | Sanders et al. | |
| 7,535,576 B2 | 5/2009 | Keyser et al. | |
| 7,583,384 B2 | 9/2009 | Keith et al. | |
| 7,586,619 B2 | 9/2009 | Strandjord et al. | |
| 2004/0061863 A1 | 4/2004 | Diaonnet | |
| 2007/0133003 A1 * | 6/2007 | Sanders et al. | 356/461 |
| 2007/0242276 A1 * | 10/2007 | Hughes et al. | 356/461 |
| 2008/0137091 A1 * | 6/2008 | Sanders et al. | 356/461 |
| 2010/0046000 A1 * | 2/2010 | Kitamura et al. | 356/461 |
| 2010/0053631 A1 * | 3/2010 | Kitamura | 356/461 |
| 2010/0253948 A1 * | 10/2010 | Strandjord et al. | 356/464 |

OTHER PUBLICATIONS

Hald et al., "Efficient Suppression of Diode-Laser Phase Noise by Optical Filtering", "2005 Optical Society of America", Apr. 11, 2005, vol. 22, No. 11.

Merlo et al., "Fiber Gyroscope Principles", "Handbook of Optical Fibre Sensing Technology", 2002, Publisher: John Wiley & Sons.

Rabus et al., "Optical Filter and Laser Applications Using Micro Ring Resonators", "http://www.techonline.com/showArticle.jhtml?articleID=192200552", Jul. 25, 2001, pp. 1-4.

Xia et al., "Ultra-Compact High Order Ring Resonator Filters Using Submicron Silicon Photonic Wires for On-Chip Optical Interconnects", "2007 Optical Society of America", Sep. 5, 2007, pp. 11934-11941, vol. 15, No. 19.

* cited by examiner

SYSTEM AND METHOD FOR REDUCING LASER PHASE NOISE IN A RESONATOR FIBER OPTIC GYROSCOPE

CROSS-REFERENCE TO RELATED APPLICATIONS

This application is related to the following co-pending United States patent application which is hereby incorporated herein by reference:

U.S. provisional patent application Ser. No. 61/285,990 filed Dec. 13, 2009 entitled "LIGHT-PHASE-NOISE ERROR REDUCER" filed on even date herewith and which is referred to herein as the '537 application.

BACKGROUND

Gyroscopes (also referred to herein as gyros) have been used to measure rotation rates or changes in angular velocity about an axis of rotation. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating closed optical path, and the difference in the two pathlengths is proportional to the rotational rate that is normal to the enclosed area.

In a resonator fiber optic gyro (RFOG), the counter-propagating light beams are typically monochromatic (e.g., in a single frequency) and circulate through multiple turns of the fiber optic coil and for multiple passes through the coil using a device, such as a fiber coupler, that redirects light that has passed through the coil back into the coil again (i.e., circulates the light). The beam generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a wavelength $\lambda$ is referred to as "on resonance" when the round trip resonator pathlength is equal to an integral number of wavelengths. A rotation about the axis of the coil produces a different pathlength for clockwise and counterclockwise propagation, thus producing a shift between the respective resonance frequencies of the resonator, and the frequency difference, such as may be measured by tuning the CW beam and CCW beam frequencies to match the resonance frequency shift of the closed optical path due to rotation, indicates the rotation rate.

SUMMARY

In one embodiment, a resonator gyroscope is provided. The resonator gyroscope comprises a reference laser generator to produce a reference light; a first slave light source to produce a first slave light locked to the reference light; a second slave light source to produce a second slave light locked to the reference light; a resonator coupled to said first and second light sources, the resonator having first and second counter-propagating directions and resonance tracking electronics coupled to the Sagnac resonator to generate a first beat frequency based on a first resonance frequency for the first counter-propagating direction, a second beat frequency based on a second resonance frequency for the second counter-propagating direction, and a third beat frequency based on a third resonance frequency for the second counter-propagating direction; wherein the rotational rate of the resonator gyroscope is a function of the first, second and third beat frequencies.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, the terms "light source" and "laser" are interchangeable. Similarly, as used herein, the terms "laser beam" and "light" are interchangeable.

Figure 1:
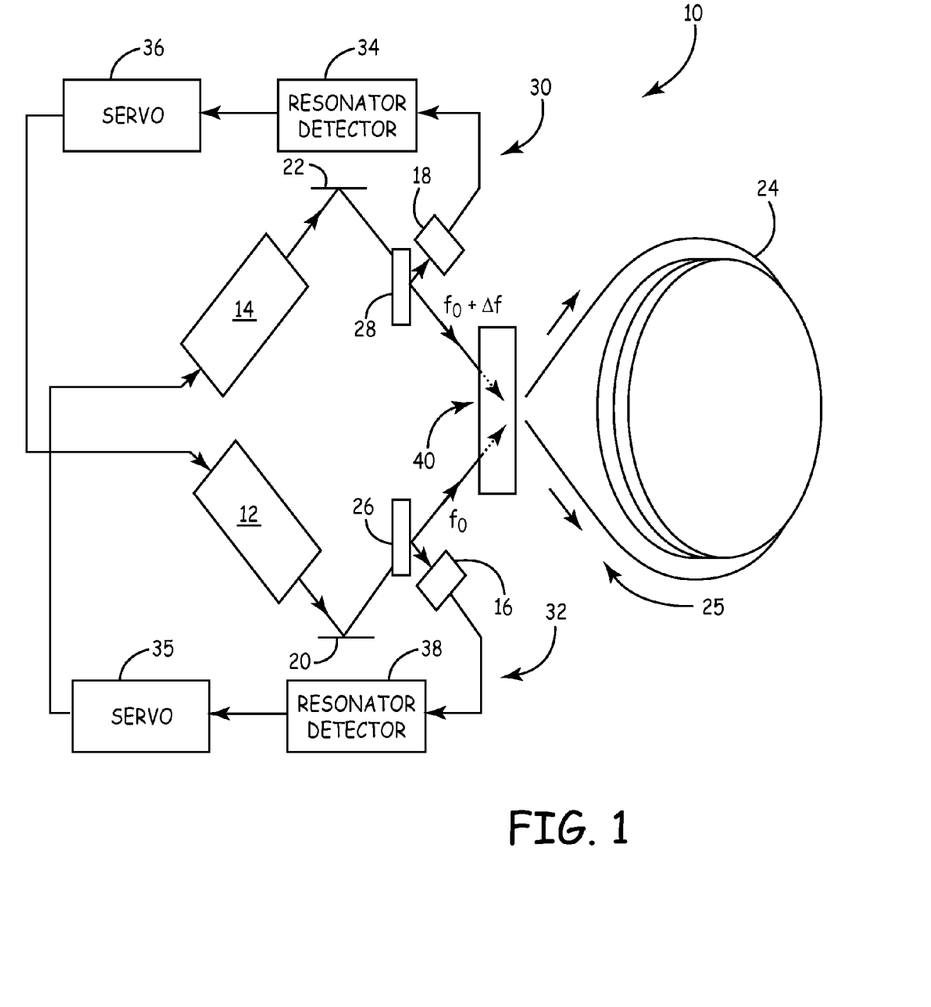
FIG. 1 is a block diagram of one embodiment of a resonator gyroscope.

FIG. 1 is a block diagram of one embodiment of a resonator gyro 10. The resonator gyro 10 comprises tunable light sources 12, 14 (e.g., tunable lasers) that synthesize light beams, respectively, and a resonator 25 circulating light beams in counter-propagating directions. The resonator 25 includes a recirculator 40 and a resonator coil 24. The recirculator 40 introduces a portion of the light beams from the tunable light sources 12, 14 into the resonator coil 24. For example, the recirculator 40 is comprised of a plurality of mirrors and a plurality of polarizers in some embodiments.

The resonator gyro 10 also includes photodetectors 16, 18 that sample light circulating in the resonator 25, and resonance detectors 34, 38 coupled to the photodetectors 18, 16, respectively, that detect the centers of resonance dips for each of the counter-propagating directions of the resonator 25. The resonator gyro 10 also includes servos 36, 35 having an input coupled to the resonance detectors 34, 38, respectively, and an output coupled to the tunable light sources 14, 22, respectively. These components of the resonator gyro 10 thus form resonance tracking loops 30, 32 for each counter-propagating direction (e.g., clockwise (CW) and counter-clockwise (CCW)).

The light beam produced by the first tunable laser 12 (e.g., CCW laser) is tuned to a frequency f 0, and the light beam produced by the second tunable laser 14 (e.g., CW laser) is tuned to a frequency f 0+Δf. The relative frequency drift and jitter between the two laser frequencies is preferably substantially minimized to a level that minimizes or does not affect the accuracy and stability of the frequency shift, and thus rotational rate, measurement. This can be accomplished by locking the laser frequencies to the resonance frequencies with servos 36, 35 of resonance tracking loops 30 and 32 having sufficient loop gain within the rotation measurement frequency band. Sufficient loop gain is obtained by selecting a modulation frequency that is substantially greater than the required unity gain frequency for the resonance tracking loops 30, 32. For example, the modulation frequency is at least about four times the unity gain frequency for the resonance tracking loops 30, 32 in some embodiments. Additionally, this can be accomplished by the laser frequency stabilization techniques described below. Each of the tunable lasers 12, 14 sinusoidally frequency modulates the light beams at the respective frequencies. Additionally, the resonator gyro 10 may include additional mirrors 20, 22 and beam splitters 26, 28 for directing the propagation of light beams from the tunable lasers 12, 14 to the resonator 25 and for directing light from the resonator 25 to the photodetectors 16, 18.

The resonator 25 comprises the recirculator 40 and an optical fiber coil 24 having first and second ends coupled to the recirculator 40. In some embodiments, the optical fiber coil 24 is a hollow core optical fiber coil. The recirculator 40 introduces the modulated light beams (e.g., CW and CCW input light beams) into the optical fiber coil 24 and circulates a portion of the modulated light beams through the optical fiber coil 24. The recirculator 40 reintroduces light emerging from one end of the optical fiber coil 24 into the other end of the fiber coil 24, thus causing light to propagate through the fiber coil 24 many times.

After receiving the modulated light beams from the tunable lasers 12, 14, the recirculator 40 directs a portion of the two modulated light beams in counter-propagating directions (e.g., CW and CCW directions). By application of the Sagnac Effect, the optical gyro 10 senses a rotation rate about an axis of the optical gyro 10. The photodetectors 18, 16 convert optical signals representing the circulating light beams to electrical signals, and the resonance detectors 34 and 38 detect the resonance centers of the resonance lineshapes for the CW and CCW circulating light beams and determine the resonance frequencies associated with each of the counter-propagating directions of the resonator 25 based on the frequency shift between the detected resonance centers. The frequency shift is used to determine the rotation rate of the optical gyro 10. For example, the first light beam (e.g., a CW beam) has an unshifted laser frequency f 0 and is introduced into the resonator 25. For rotation sensing, the frequency f 0 of the CW beam is tuned (e.g., by tuning the frequency of the laser 12) to the resonance frequency of the resonator 25 in the CW direction. The second light beam (e.g., a CCW beam) is tuned the frequency f 0+Δf to align the CCW beam frequency with a resonance center relative to the resonance frequency of the resonator 25 in the CCW direction.

To measure the resonance center-frequencies in either the CW direction or CCW direction, a standard synchronous detection technique is used. Each input light beam is sinusoidally phase-modulated, and therefore frequency modulated at frequencies fm and fn, respectively, to dither each input beam frequency across a resonance lineshape as measured by the photodetectors 18, 16. For example, additional circuitry coupled to the photodetectors 18, 16 may demodulate the output of the photodetectors 18, 16 at the frequencies fm and fn, respectively, to measure resonance centers indicated by the light outputs of the CW and CCW beams. At a line center of the resonance lineshape, or the resonance center, the optical sensor 16 detects a null output at the fundamental frequencies fm and fn, respectively. When the input beam frequency (e.g., f 0+Δf or f 0) is off-resonance, an error signal at frequencies fm and fn, respectively, is sensed by the photodetector and used to tune the respective beam frequency to the respective resonance frequency of the resonator 25. The frequency of the CW beam is tuned by changing the frequency, f 0, of the laser 12 and the frequency of the CCW beam is adjusted via a feedback loop that changes the frequency shift, Δf, of the second laser 14 so that f 0+Δf matches the CCW resonance frequency of the resonator 25.

In the absence of rotation, the round-trip path-lengths of the CW and CCW beams inside the resonator 25 in the CW and CCW direction, respectively, are substantially equal. Thus, Δf is tuned to zero by the second laser 14. In the presence of rotation, the round-trip path-lengths differ between the CW and the CCW directions producing a resonance frequency difference between the two directions that is proportional to the rotation rate. By tuning the frequency f0 to track the CW resonance and the frequency Δf to track the CCW resonance center, the rotation rate is determined.

In this example, the CW and CCW beams propagate through a hollow core, band-gap, optical fiber having an extremely low bend loss, and the coil 24 has a large number of turns about a substantially small area to achieve a compact gyro. For example, the coil 24 may have from about 20-40 turns of the optical fiber about a one centimeter diameter. The hollow core optical fiber is typically glass-based with a plastic outer jacket and a hollow inner core. In the hollow core optical fiber, light injected from the recirculator 40 traverses mostly through free space (e.g., air or a vacuum) along the core, and only about a few percent or less of the optical energy of light is contained in the glass walls of the fiber surrounding the hollow core. Because a large majority of the light energy traverses through free space along the hollow core of optical fiber, the transition between the recirculator 40 and the hollow core optical fiber has a near-perfect index matching, and a high reflectivity laser mirror with low loss and attractive polarization properties may be used for the recirculator 40. The hollow core fiber is suited to significantly attenuate the rotation measurement errors commonly associated with the properties of the glass medium in the core of conventional fibers. However, it is to be understood that other types of optical fiber can be used in other embodiments.

The CW resonance tracking loop 30 locks the CW laser 12 onto a CW resonance frequency of the resonator 25, and the CCW resonance tracking loop 32 locks the CCW laser 14 onto a CCW resonance frequency of the resonator 25. The output of each of the resonance detectors 34, 38 is an error signal indicating a laser frequency deviation away from the resonance frequency of the resonator 25. The servos 36, 35 tune the lasers 12, 14 to maintain the error signal, and thus the frequency deviation, substantially at zero.

Figure 2:
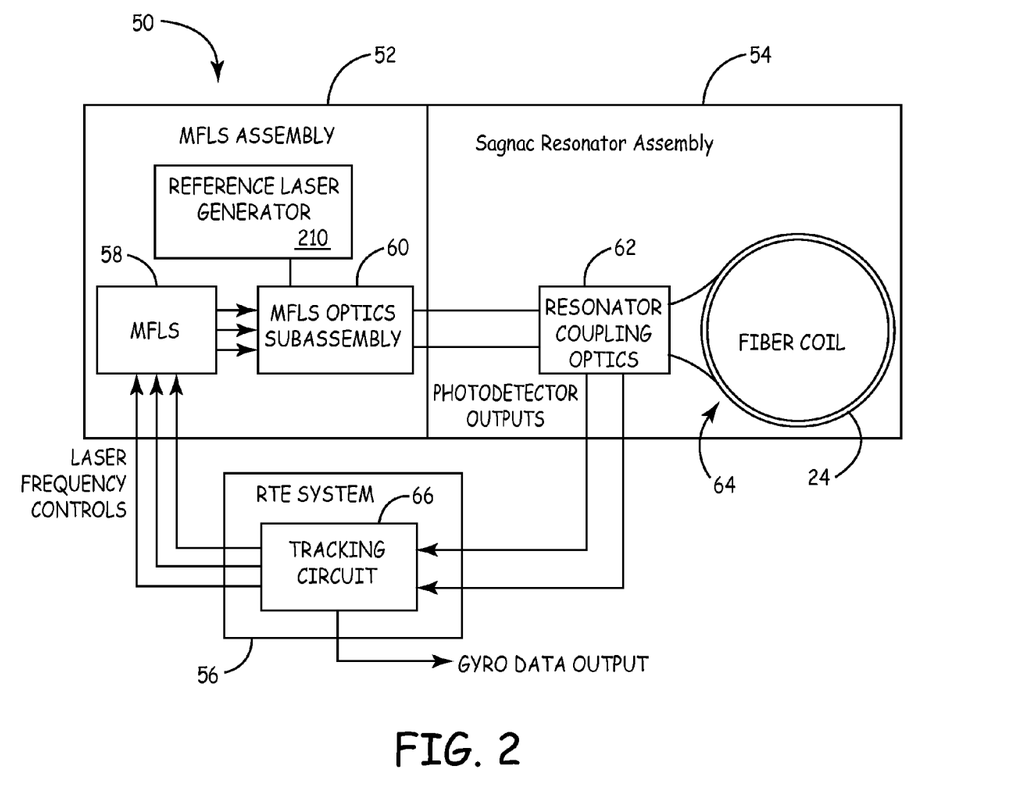
FIG. 2 is a block diagram of another embodiment of a resonator gyroscope.

FIG. 2 is a block diagram of another embodiment of a resonator gyro 50. The resonator gyro 50 comprises a multi-frequency laser source (MFLS) assembly 52, a Sagnac resonator assembly 54 coupled to an output of the MFLS assembly 52, and a resonance tracking electronics (RTE) system 56 having an input coupled to an output of the Sagnac resonator assembly 54, a first output coupled to an input of the MFLS assembly 52, and a second output for providing gyro data of the resonator gyro 50. Using a feedback loop from the Sagnac resonator assembly 54 to the MFLS assembly 52 via the RTE system 56, a plurality of lasers in the MFLS assembly 52 are tunable to produce modulated light beams that are locked onto the resonance frequency corresponding to a respective propagation direction in the resonator.

The MFLS assembly 52 includes a reference laser generator 210. In one exemplary embodiment using two slave lasers locked to a stabilized reference laser from the reference laser generator 210, a first slave laser produces a CW beam that is tuned to a resonance frequency of the CW direction of the resonator, and a second slave laser produces a CCW beam that is tuned to a resonance frequency of the CCW direction of the resonator. The resonance frequency of the CCW direction is on a different longitudinal resonance mode (e.g., at a resonance frequency that is at least one longitudinal resonance mode away from the resonance frequency of the CW direction) than the resonance frequency of the CW direction. The frequency spacing between adjacent modes is termed the free spectral range (FSR). The difference between the resonance frequencies of the CCW direction and the CW direction produces a beat frequency. To eliminate optical backscatter errors, two lasers are used that are tuned to frequencies at least one longitudinal resonance mode apart. To remove a large bias and associated bias instabilities (e.g., due to the FSR being part of the measurement), the CCW beam is switched between a CCW resonance frequency that is at least one longitudinal resonance mode lower than the resonance frequency of the CW direction and a CCW resonance frequency that is at least one longitudinal resonance mode higher than the resonance frequency of the CW direction. By subtracting the beat frequency occurring when the resonance frequency of the CCW direction is one longitudinal resonance mode lower than the resonance frequency of the CW direction from the beat frequency occurring when the resonance frequency of the CCW direction is one longitudinal resonance mode higher than the resonance frequency of the CW direction, an output value is produced that is about two times the frequency difference $\Delta f$, as described in more detail below.

In another exemplary embodiment using three slave lasers locked to the master reference laser from the reference laser generator 210, a first slave laser produces a CW beam that is tuned to a resonance frequency of the CW direction of the resonator. A second slave laser produces a CCW beam that is tuned to a resonance frequency of the CCW direction of the resonator that is at least one longitudinal resonance mode lower than the resonance frequency of the CW direction, and a third slave laser produces another CCW beam that is tuned to a resonance frequency of the CCW direction of the resonator that is at least one longitudinal resonance mode higher than the resonance frequency of the CW direction. By subtracting the beat frequencies, as described in more detail below, an output value is produced that is about two times the frequency difference $\Delta f$. Although two slave laser and three slave laser configurations of the resonator gyro 50 are described, additional lasers may be incorporated with the resonator gyro 50.

The MFLS assembly 52 comprises an MFLS 58 and an MFLS optics subassembly 60 coupled to an output of the MFLS 58 that routes the modulated light beams to the Sagnac resonator assembly 54 and provides an optical feedback of the modulated light beams to the MFLS. The MFLS optics subassembly 60 includes, but is not necessarily limited to, the two or more slave lasers for generating the modulated light beams in response to control signals from the RTE system 56 and the master reference laser from the reference laser generator 210. The Sagnac resonator assembly 54 comprises resonator coupling optics 62 (e.g., the recirculator 40 and photodetectors 16, 18 shown in FIG. 1) having an input coupled to the MFLS optics subassembly 60 and a resonator fiber coil 64 coupled to a first output of the resonator coupling optics 62. The resonator fiber coil 64 is implemented as a hollow core fiber coil, such as fiber coil 24 shown in FIG. 1, and circulates a portion of the modulated light beams in counter-propagating directions. The resonator coupling optics 62 provides electrical signals of resonator optical outputs (e.g., intensity measurements of the CW and CCW circulating beams) to the RTE system 56 via a second output.

The RTE system 56 comprises a resonance tracking circuit 66 having an input coupled to the second output of the resonator coupling optics 62 and has an output coupled to an input of the MFLS 58. The RTE system 56 may comprise additional components such as analog-to-digital (A/D) converters and digital-to-analog converters (DACs) for processing signals received from the resonator coupling optics 62 and transmitted to the MFLS 58. The RTE system 56 produces laser frequency control signals for the slave lasers in the MFLS optics subassembly 60 and applies a constant offset to the light beams generated by at least one of the slave lasers. For example, in some embodiments, the constant offset is based on a longitudinal resonance mode between one resonance center and another resonance center, as detected by the photodetectors in the resonator coupling optics 62 of a corresponding light beam.

Figure 3:
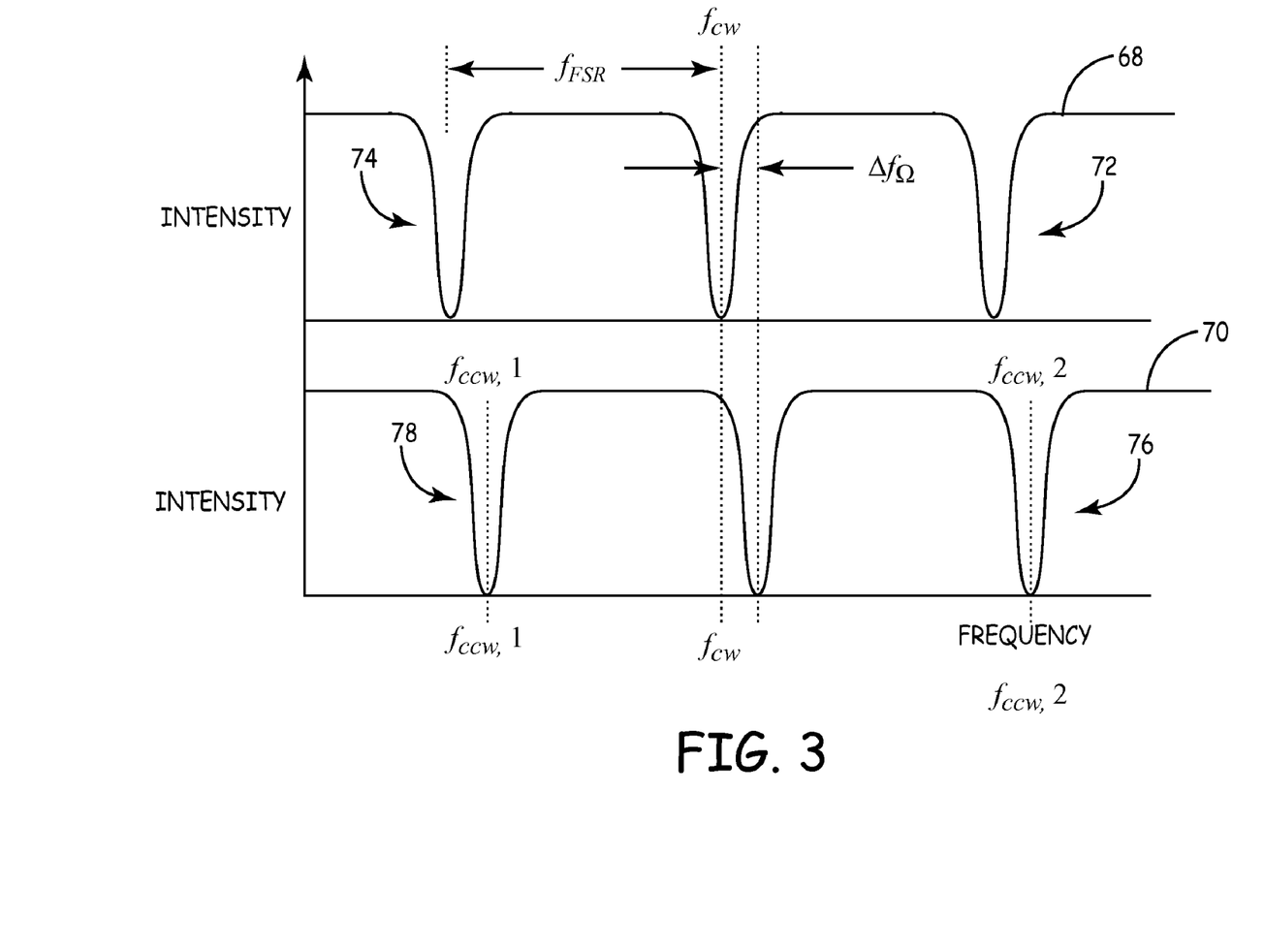
FIG. 3 is a graph of an exemplary clockwise intensity waveform and an exemplary counter-clockwise intensity waveform.

FIG. 3 is a graph of an exemplary clockwise intensity waveform 68 and an exemplary counter-clockwise intensity waveform 70 useful in understanding the resonator gyro 50. Referring to FIGS. 2 and 3, in an exemplary embodiment, when the CW beam is tuned to the resonance frequency of the CW direction of the resonator coil 64, the CW intensity waveform 68 is observed having resonance dips 72, 74 occurring at different longitudinal resonance modes. Similarly, when the CCW beam is tuned to the resonance frequency of the CCW direction of the resonator coil 64, the CCW intensity waveform 70 is observed having resonance dips 76, 78 occurring at different longitudinal resonance modes. The centers of these resonance dips 72, 74, 76, 78 indicate resonance frequencies at different longitudinal resonance modes.

For an RFOG system with four lasers, one being a reference laser (or master laser) and the other three being resonance tracking lasers (or slave lasers), as described below, the slave lasers are phase locked to the reference lasers with independent controllable frequency offsets for each slave laser. The frequency (fr) of the reference laser is set such that the beat frequencies between the slave lasers and the reference laser are within normal operating limits of the gyro electronics while the slave lasers are locked to the resonator. In particular, the first slave laser is tuned to a CW resonance frequency $f_{cw}$ or $f_1$, the second slave laser is tuned to a first CCW resonance frequency, $f_{ccw,1}$ or $f_2$, that is one longitudinal mode lower than the CW resonance frequency $f_{cw}$ at zero rotation rate of the resonator gyro 50, and the third slave laser is tuned to a second CCW resonance frequency, $f_{ccw,2}$ or $f_3$, that is one longitudinal mode higher than the CW resonance frequency $f_{cw}$ at zero rotation rate of the resonator gyro 50

In one example, the reference frequency, $f_r$, is set to be higher than the slave frequencies. In this example the slave beat frequencies for slave 1, 2 and 3 respectively are: $\Delta f_1 = f_r - f_1$, $\Delta f_2 = f_r - f_2$, and $\Delta f_3 = f_r - f_3$. The RTE 56 of FIG. 2 generates the three beat frequencies using direct digital synthesizer (DDS) chips. The RTE 56 controls the three beat frequencies to maintain the slave lasers on their respective resonance frequencies. The gyro data $\Delta f_1$, $\Delta f_2$ and $\Delta f_3$ can be output to a processor that makes the calculation $(\Delta f_1 - \Delta_3) - (\Delta f_2 - \Delta f_1) = 2\Delta f\Omega$, where $\Delta f\Omega$ is proportional to rotation rate, $\Delta f_1 - \Delta f_3 = f_{FSR} + \Delta f\Omega$, and $\Delta_2 - \Delta_1 = f_{FSR} - \Delta f\Omega$. Thus, a rotation measurement is obtained without FSR and any associated bias and bias instability.

In the two laser exemplary embodiment, the CW beam is locked onto a resonance dip at the resonance frequency $f_{cw}$. The CCW beam is locked onto a resonance dip at the resonance frequency $f_{ccw,1}$, which is one longitudinal mode away from the CW resonance (e.g., has one less wave cycle that fits within the resonator ring) at zero rotation rate of the resonator gyro 50. The frequency spacing, $f_{FSR}$, between adjacent modes is termed the free spectral range. Since the FSR depends on the optical pathlength, which can depend on temperature due to thermal expansion, the resulting bias may be unstable due to temperature variations.

The effects of the FSR are substantially removed by periodically switching the frequency of the CCW beam from the resonance dip that is one longitudinal mode lower (e.g., $f_{ccw,1}$) than the CW resonance to the resonance dip that is one longitudinal mode higher (e.g., $f_{ccw,2}$) than the CW resonance. The CW beam is maintained on the resonance dip at the resonance frequency $f_{cw}$.

Figure 4:
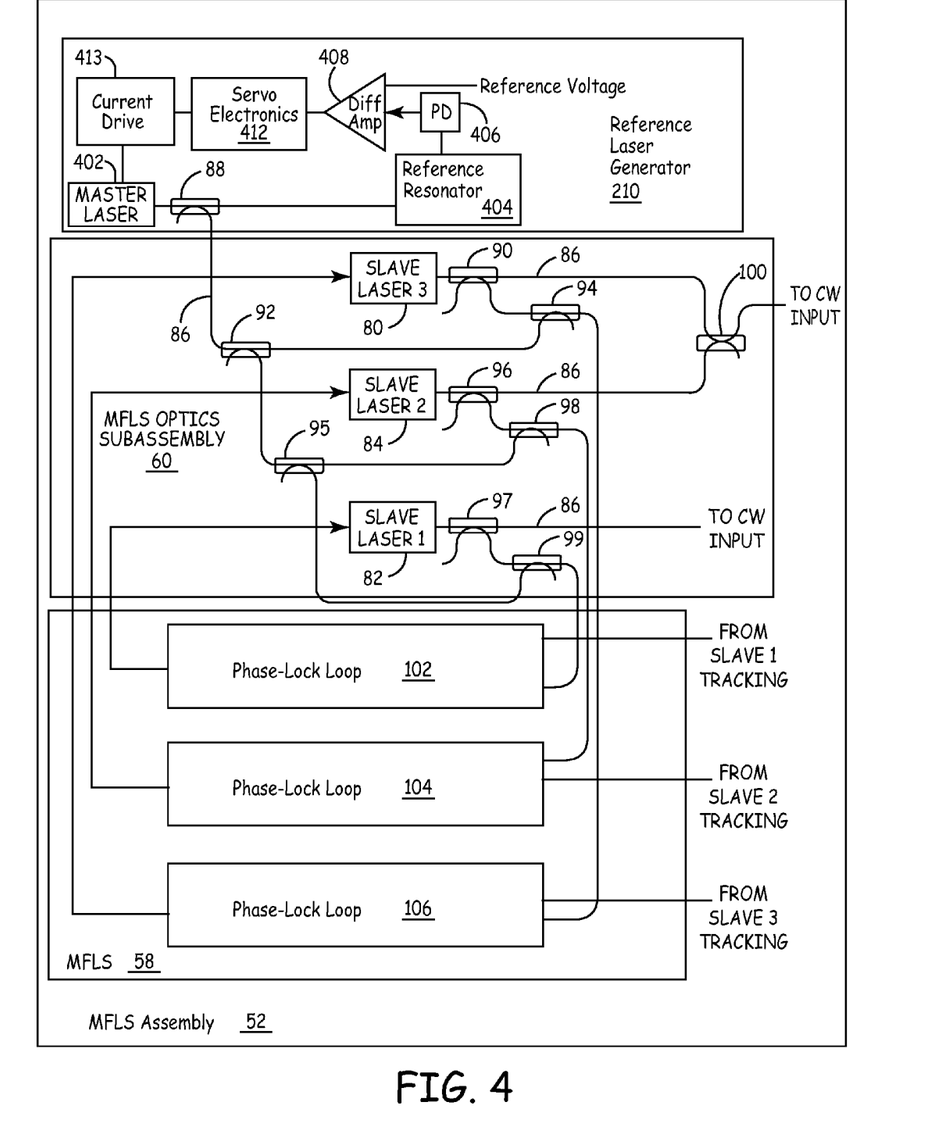
FIG. 4 is a block diagram of one embodiment of a multi-frequency laser source assembly.

FIG. 4 is a block diagram of one embodiment of the multi-frequency laser source assembly 52 shown in FIG. 2. The MFLS optics subassembly 60 comprises a first slave laser 82, second slave laser 84, third slave laser 80, optical couplers 90, 92, 94, 95, 96, 97, 98, 99, 100, and an optical fiber 86 coupled to the outputs of each of the lasers 80, 82, and 84, and between the optical couplers 90, 92, 94, 95, 96, 97, 98, 99, 100. The optical fiber 86 is implemented as a polarization maintaining single mode fiber in this example. The first slave laser 82 produces a CW beam for introduction to the CW input of the resonator coil 64, and the slave lasers 80, 84 produce CCW beams for introduction to the CCW input of the resonator coil 64. A portion of each of the CCW beams are combined by the coupler 100 prior to introduction to the CCW input of the resonator coil 64.

The reference laser generator 210 comprises a master laser 402, frequency discriminator 404, photodetector 406, differential amplifier 408, servo electronics 412, and laser current drive 413. The master laser 402 produces a reference laser beam having a frequency of f0+Δf0, where f0 is the center frequency of the reference laser beam and Δf0 represent frequency noise or jitter in the laser beam. The reference laser beam is passed through the frequency discriminator 404. In the examples described herein, the frequency discriminator 404 is implemented as an optical resonator. Hence, the frequency discriminator 404 is also referred to herein as a reference resonator. However, it is to be understood that, in other embodiments, other types of frequency discriminators can be used.

Figure 5:
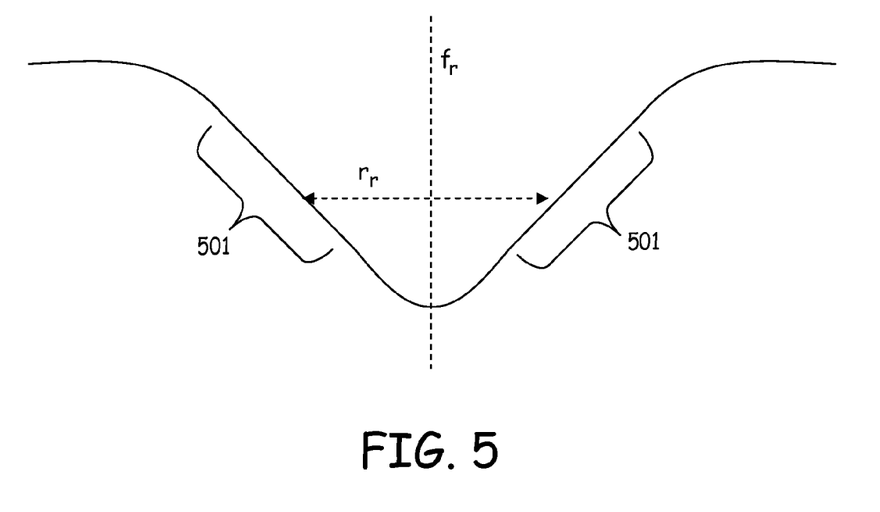
FIG. 5 is a graph of an exemplary resonance curve of a reference resonator.

The reference resonator 404 is configured to have a broad linewidth with high linearity at the sides of the curve, as shown in FIG. 5. The exemplary resonance curve shown in FIG. 5 has a center frequency, fr, and linear portions 501 at the sides of the curve. The linewidth is sufficiently broad that both the frequency, f0, and noise, Δf0, of the reference laser beam both fit on the linear portion 501 of the curve. In particular, the reference laser generator 210 locks the reference laser beam to the linear portion 501 of the curve through the resonator. Locking the reference laser beam to the linear portion reduces harmonics in down converting any jitter above the resonance tracking demodulation frequency to intensity noise at the resonance tracking demodulation frequency. In other words, the jitter is converted to intensity noise linearly. In particular, as the frequency jitters, the output of the reference resonator 404 is input into the photodector 406.

The photodetector 406 sees the intensity fluctuation which is converted linearly to an electrical voltage which is output to the differential amplifier 408. The differential amplifier 408 compares the output of the photodetector 406 with a stable voltage reference. The differential amplifier 408 also introduces sufficient gain into the output of the differential amplifier 408 so that as the laser jitters one way or the other, the noise is taken out using the servo electronics 412 which generates a control signal based on the output of the differential amplifier 408. The control signal is input to a current driver 413 which causes the master laser 402 to adjust the current of the reference laser beam which in turn adjust the frequency. After it is locked, the frequency jitter of the reference laser gets smaller, especially at low frequencies. An alternative reference laser generator is shown and described with respect to FIG. 7 below.

Referring to FIG. 4, optical coupler 88 couples a portion of the light from the master laser 402 to the MFLS optics subassembly 60. The optical couplers 90, 92, 94, 95, 96, 97, 98, and 99 couple light from the master laser 402 with light from the slave lasers 80, 82, and 84 to provide feedback for phase locking the slave lasers 80, 82, and 84 with the master laser 402. For example, a portion of the reference laser beam produced by the master laser 402 is mixed with a portion of the CW beam produced by the first slave laser 80 via the optical couplers 92, 95, 97 and 99. A portion of the CCW beam produced by the second slave laser 84 is mixed with a portion of the reference laser beam produced by the master laser 402 via the optical couplers 92, 95, 96, and 98. Similarly, a portion of the CCW beam produced by the third slave laser 80 is mixed with a portion of the reference laser beam produced by the master laser 402 via the optical couplers 92, 94, and 90.

This mixed light is provided to the MFLS 58. The MFLS 58 comprises Phase Lock Loop drive circuits 102, 104, and 106 for each of the lasers 82, 84, and 80, respectively. Each PLL beats the light from the respective slave laser with light from the master laser 402 and makes the respective slave laser follow the master laser 402. The light from each slave laser also has low-frequency noise or jitter. However, after beating with the reference laser beam, each slave laser is locked to the master laser 402 which substantially removes the low-frequency jitter. The control signal output from the PLLs 102, 104, 106 controls the frequency of the slave lasers based on the mixed light received from the MFLS optics subassembly 60 and a corresponding signal from the RTE system 56.

As stated above, each laser beam is delivered to an input of the Sagnac resonator assembly. For example, the laser beam from slave laser 82 is delivered to the CW input of the Sagnac resonator assembly 54. The laser beams from slave lasers 80 and 84 are coupled together in optical coupler 100. The coupled laser beams from slave lasers 80 and 84 are collinear going into the CCW input of the Sagnac resonator assembly 54.

Figure 6:
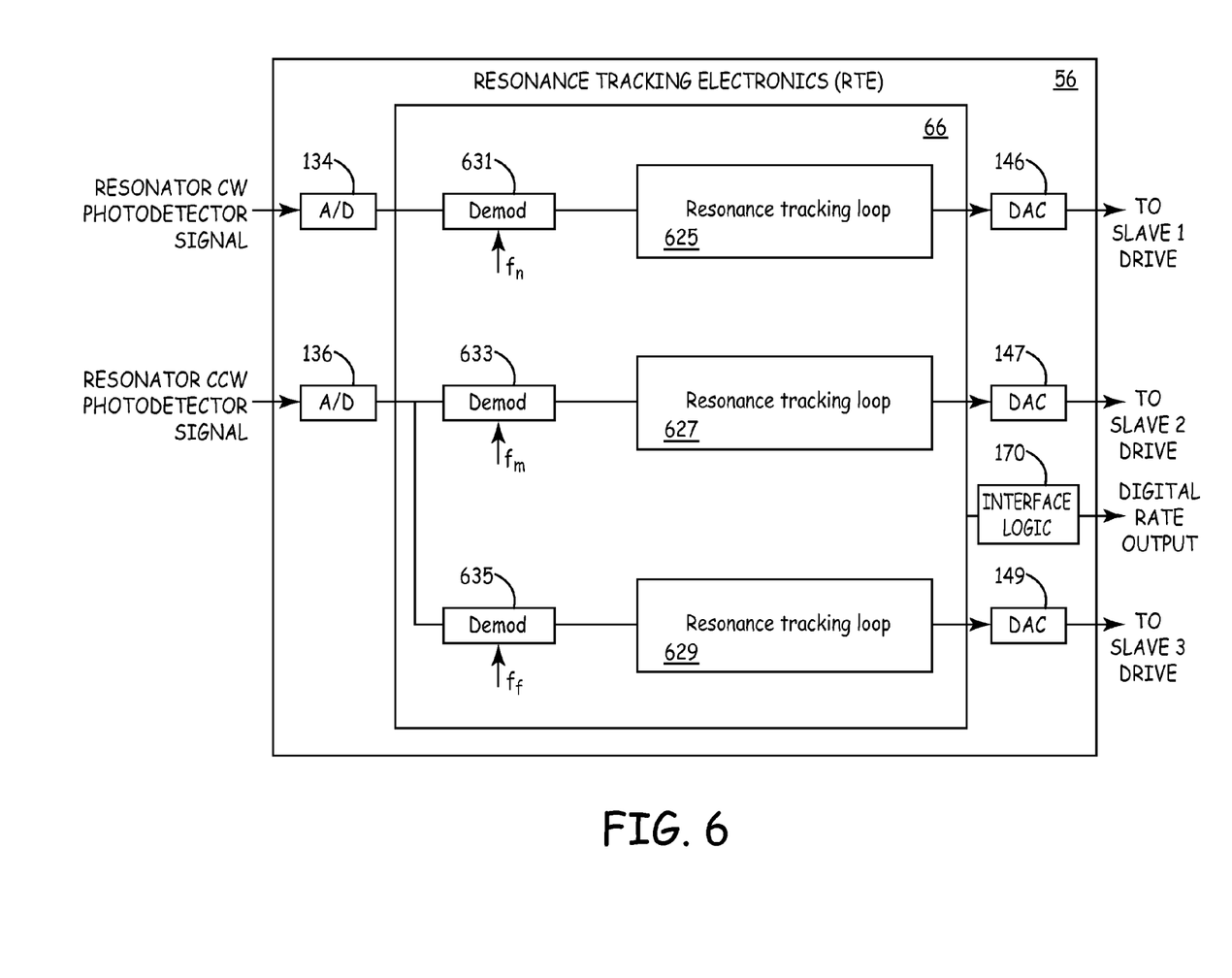
FIG. 6 is a block diagram of one embodiment of resonance tracking electronics.

FIG. 6 is a schematic diagram of an exemplary RTE system such as the RTE system 56 shown in FIG. 2. In addition to the resonance tracking circuit 66, the RTE system 56 optionally includes, in some embodiments, a first analog-to-digital (A/D) converter 134 coupled to an input of the resonance tracking loop 625, a second A/D converter 136 coupled to an input of the resonance tracking loops 627 and 629, a digital-to-analog converter (DAC) 146 coupled to an output of the resonance tracking loop 625, and DAC 147, 149 coupled to a corresponding output of the resonance tracking loops 627 and 629. The A/D converter 136 digitizes CCW photodetector signals received from the resonator coupling optics 62. Similarly, the A/D converter 136 digitizes the CW photodetector signals received from the resonator coupling optics 62. In this embodiment, the DAC 146, 147, 149 convert the output of the resonance tracking loops 625, 627, 629 to an analog signal.

In this exemplary embodiment, the resonance tracking circuit 66 is implemented as a field programmable gate array (FPGA). However, in other embodiments, other programmable logic devices known to one of skill in the art are used. The resonance tracking circuit 66 comprises demodulators 631, 633, 635 and resonance tracking loops 625, 627, 629. Demodulator 631 demodulates the signal of the CW direction at a predetermined demodulation frequency, $f_n$, corresponding to the modulation frequency of laser beam generated by the slave laser 82. Demodulator 633 demodulates the signal of the CCW direction at a predetermined demodulation frequency, $f_m$, corresponding to the modulation frequency of laser beam generated by the slave laser 84. Demodulator 635 demodulates the signal of the CCW direction at a predetermined demodulation frequency, $f_p$, corresponding to the modulation frequency of laser beam generated by the slave laser 80.

The resonance tracking loop 625 locks the CW laser beam onto the CW resonance frequency, $f_1$, and provides a signal indicating the beat frequency, $\Delta f_1$. Similarly, the resonance tracking loops 627 and 629 lock the CCW laser beam onto the corresponding CCW resonance frequency, $f_2$ or $f_3$, and provide a signal indicating the beat frequencies $\Delta_2$ and $\Delta f_3$. The outputs of the resonance tracking loops 625, 627, and 629 are provided to the MFLS 58 for controlling the frequency of the slave lasers 82, 84, and 80, respectively. In addition, the beat frequencies $\Delta f_1$, $\Delta f_2$, and $\Delta f_3$ can be output to a processor via interface logic 170 for calculating the rotational rate of the gyro based on the beat frequencies as described above.

Figure 7:
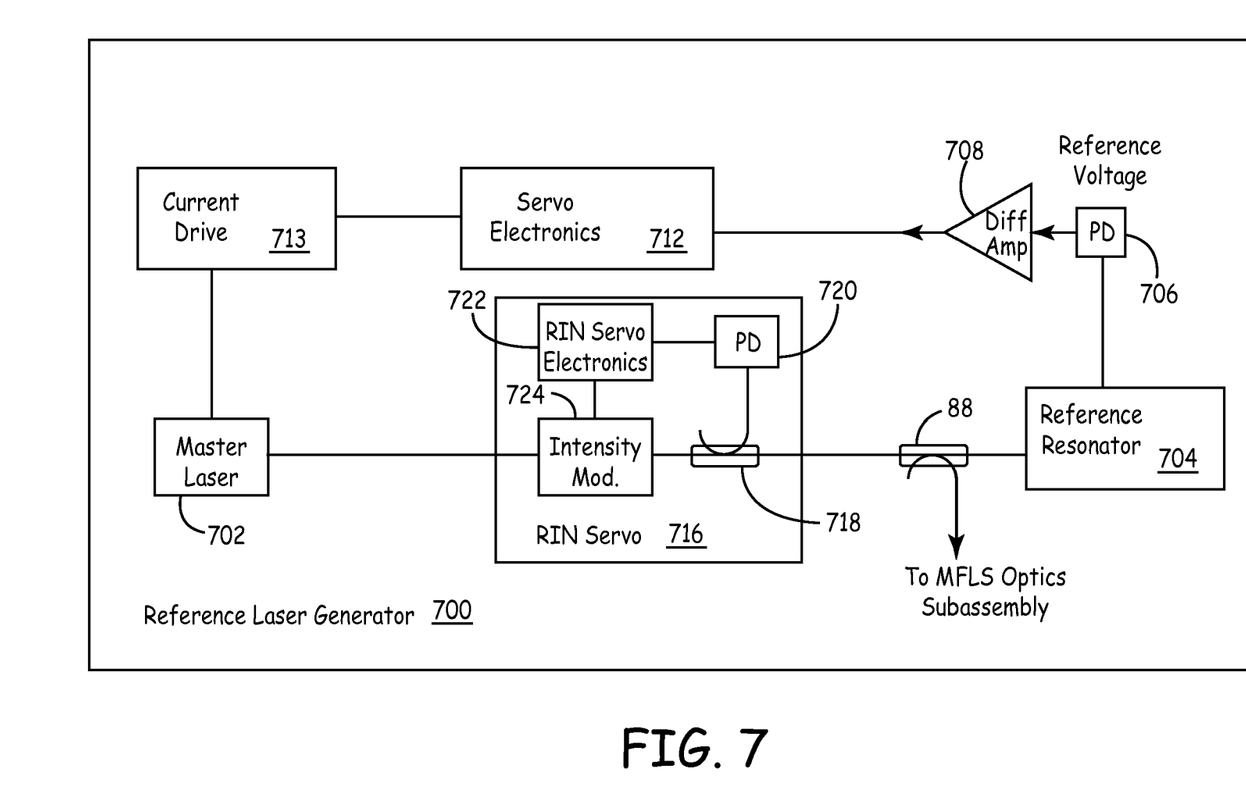
FIG. 7 is a block diagram of one embodiment of a reference laser generator.

As stated above, FIG. 7 is a block diagram of another embodiment of a reference laser generator 700. Reference laser generator 700 includes reference resonator 704, photodetector 706, differential amplifier 708, servo electronics 712, current drive 713 and master laser 702 which function as the corresponding components in the reference laser generator 210. However, reference laser generator 700 also includes Relative Intensity Noise (RIN) servo 716 that controls out intensity fluctuations. RIN is the noise or fluctuation in the intensity of the laser beam. The laser beam initially output by the master laser 702 may have RIN. The intensity fluctuation can be mistaken for frequency fluctuations, since the frequency fluctuations are converted linearly to intensity fluctuations via the reference resonator 704.

The RIN servo 716 includes an optical coupler 718, photodetector 720, RIN servo electronics 722 and intensity modulator 724. The optical coupler 718 couples a portion of the laser beam to the photodetector 720 which converts the intensity of the optical signal to an electrical signal. The electrical signal is provided to the RIN servo electronics 722 which generates command signals for controlling the intensity modulator 724. In this example, the intensity modulator 724 is implemented as a variable optical attenuator. The intensity modulator 724 introduces an equal and opposite intensity fluctuation into the laser beam to cancel the intensity fluctuation present in the laser beam. Thus, when the laser beam enters the reference resonator 704, the RIN has been substantially removed from the laser beam which further improves the stability of the reference laser generated by the reference laser generator 700.

Figure 8:
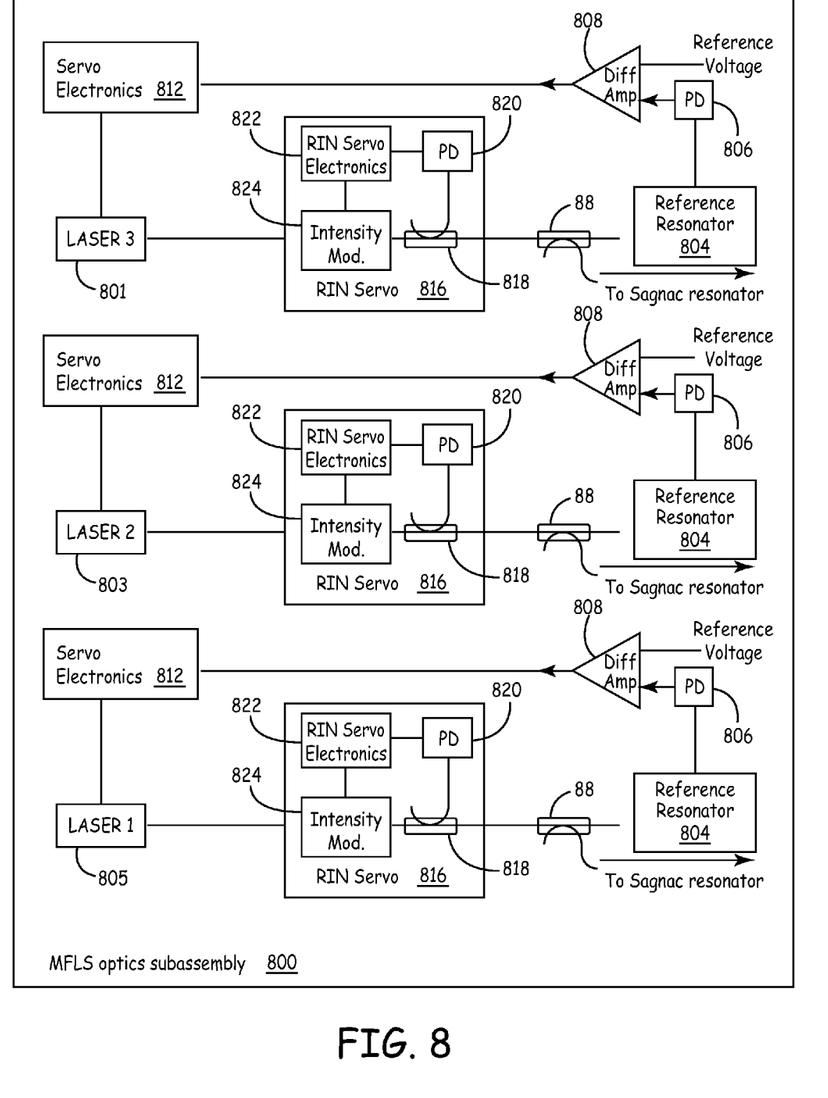
FIG. 8 is a block diagram of another embodiment of a MFLS optics subassembly.

Furthermore, an alternative embodiment of an MFLS optics subassembly 800 is shown and described in FIG. 8. In the MFLS optics subassembly 800, a reference laser generator is not included. In lieu of a reference laser generator, each laser 801, 803, and 805 is directly locked to the linear portion of a resonance curve in a reference resonator rather than via a reference laser. In particular, a light stabilization loop comprising a RIN servo 816, a reference resonator 804, photodetector 806, differential amplifier 808 and servo electronics 812 is included in the optical path of the output of each laser 801, 803, and 805. Each of the elements functions as discussed above with respect to FIGS. 4 and 7. Optical couplers 88 are used to couple a portion of the stabilized and filtered laser beam to an input of the Sagnac resonator assembly.

Figure 9:
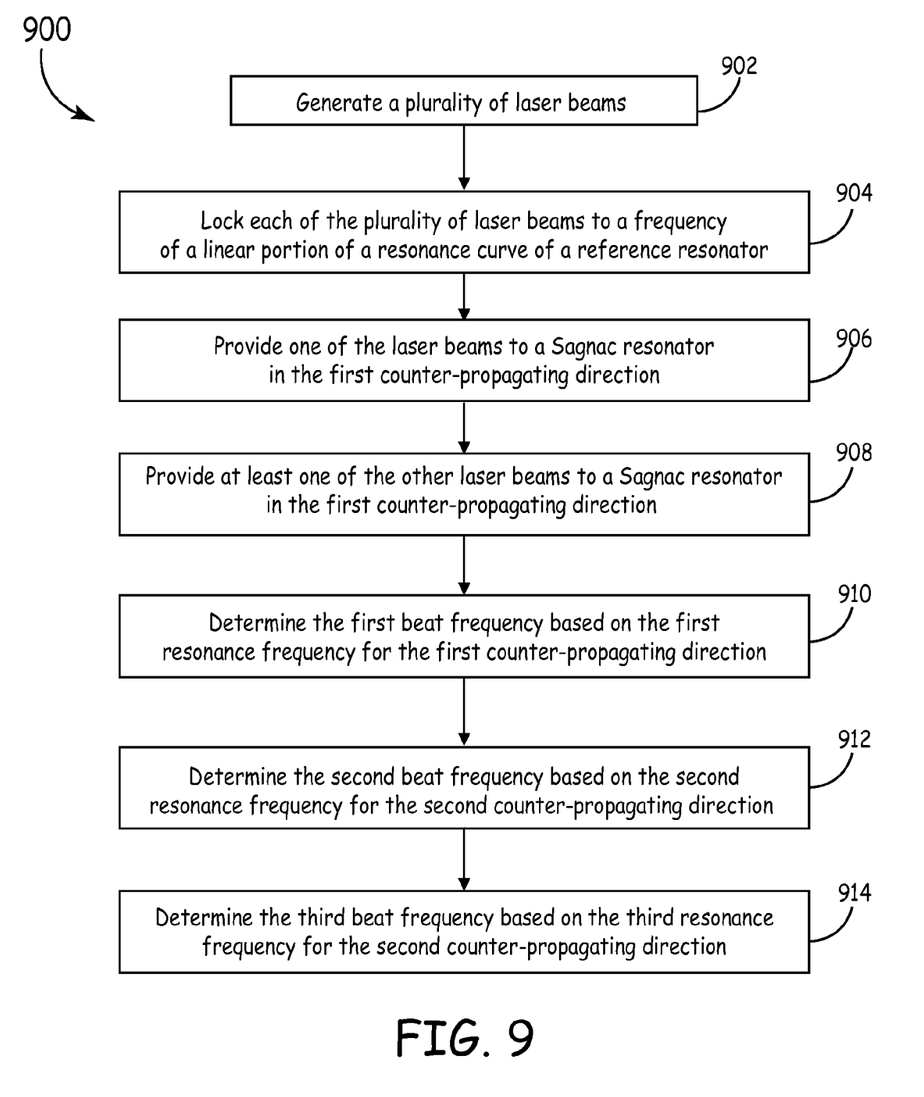
FIG. 9 is a flow chart depicting one embodiment of a method of determining a rotational rate of a resonator gyroscope.

FIG. 9 is a flow chart depicting one embodiment of a method 900 of determining a rotational rate of a resonator gyroscope. At block 902, a plurality of laser beams are generated. For example, in some embodiments, two laser beams are generated for input to a Sagnac resonator, whereas, in other embodiments, three laser beams are generated for input to a Sagnac resonator as described above. In addition, in some embodiments, generating a plurality of laser beams includes generating a reference laser beam from a master laser in a reference laser generator.

At block 904, each of the plurality of laser beams is locked to a frequency of a linear portion of a resonance curve of a reference resonator to remove low-frequency fluctuations from each of the plurality of laser beams. For example, in some embodiments, each of the plurality of laser beams is locked directly to a frequency of a linear portion of the resonance curve as described above with respect to FIG. 8. In other embodiments, a reference laser is locked directly to a frequency of a linear portion of the resonance curve and the other laser beams are locked to the reference laser as described above with respect to FIG. 4.

At block 906, one of the plurality of laser beams tuned to the resonance frequency of the first counter-propagating direction is provided to a Sagnac resonator in the first counter-propagating direction (e.g. CW direction). At block 908, at least one of the plurality of laser beams is provided to the Sagnac resonator in a second counter-propagating direction (e.g. CCW direction), as described above. For example, in some embodiments, two laser beams are provided to the Sagnac resonator in the second counter-propagating direction. One of the two laser beams is tuned to a resonance frequency that is at least one resonance mode lower than the resonance frequency of the first counter-proagating direction and the other laser beam is tuned to a resonance frequency that is at least one resonance mode higher than the resonance frequency of the first counter-propagating direction, as described above. In other embodiments, a single laser beam is provided to the Sagnac resonator in the second counter propagating direction. The single laser beam is switched between a resonance frequency that is at least one resonance mode lower than the resonance frequency of the first counter-propagating direction and a resonance frequency that is at least one resonance mode higher than the resonance frequency of the first-counter-propagating direction.

At block 910, a first beat frequency based on the first resonance frequency for the first counter-propagating direction is determined, such as through the resonance tracking electronics as described above. At block 912, a second beat frequency based on a second resonance frequency for the second counter-propagating direction is determined and at block 914, a third beat frequency based on a third resonance frequency for the second counter-propagating direction is determined, as described above. The rotational rate of the resonator gyroscope is a function of the first, second and third beat frequencies as described above.

Hence, the embodiments described above enable improved performance of the resonator gyro by providing stabilized laser beams with low phase noise. For example, since resonator fiber optic gyros (RFOGs) use a resonator as the Sagnac sensing element, narrowband laser light sources are typically required with low phase noise, and these requirements are made more stringent when combined with standard methods to reduce the effects of optical backscatter. Typically only very sophisticated, and expensive lasers meet these requirements. However, by using the techniques described above, a less expensive narrow band single mode semiconductor (SC) laser can be used. In addition, high-performance lasers also benefit from the reduction in phase noise thereby providing increased sensitivity and stability in rotation measurements.

Although specific embodiments have been illustrated and described herein, it will be appreciated by those of ordinary skill in the art that any arrangement, which is calculated to achieve the same purpose, may be substituted for the specific embodiments shown. For example, although the exemplary embodiments described above include three slave lasers, it is to be understood that other appropriate numbers of slave lasers can be used in other embodiments. In particular, in one exemplary embodiment, two slave lasers are used. In such an embodiment, one slave laser provides a laser beam to the CW input and the other slave laser provides a laser beam to the CCW input of the Sagnac resonator assembly. Appropriate changes are also made to the RTE tracking circuit and the MFLS to accommodate 2 lasers versus 3 lasers. Therefore, it is manifestly intended that this invention be limited only by the claims and the equivalents thereof.

What is claimed is:

1. A resonator gyroscope comprising:
   a reference laser generator, the reference laser generator comprising:
      a master light source to produce a reference light;
      a frequency discriminator to linearly convert frequency fluctuations of the reference light to intensity fluctuations;
      a photodetector to convert fluctuations in the intensity of an optical output of the frequency discriminator to an electrical voltage;
      a differential amplifier to compare the output voltage of the photodetector with a stable reference voltage; and
      servo electronics to provide control signals to the master light source to lock the master light source to a frequency in the linear portion of the resonance curve such that frequency fluctuations are converted linearly to intensity fluctuations, the control signals also driving the master light source such that low-frequency fluctuations in the reference light are removed;
   a first slave light source having a first modulation frequency to produce a first slave light having a first frequency;
   a first phase-lock-loop (PLL) to beat the first slave light with the reference light and to drive the first slave light source such that the first slave light is locked to the reference light;
   a second slave light source having a second modulation frequency to produce a first slave light having a second frequency;
   a second phase-lock-loop (PLL) to beat the second slave light with the reference light and to drive the second slave light source such that the second slave light is locked to the reference light;
   a resonator coupled to said first and second light sources, the resonator having first and second counter-propagating directions and comprising an optical fiber coil, wherein the resonator circulates a first circulating light through the optical fiber coil in the first counter-propagating direction, the first circulating light based on a portion of the first slave light; and circulates a second circulating light through the optical fiber coil in a second counter-propagating direction, the second circulating light based on a portion of the second slave light; and
   resonance tracking electronics coupled to the resonator to generate a first beat frequency based on a first resonance frequency for the first counter-propagating direction, a second beat frequency based on a second resonance frequency for the second counter-propagating direction, and a third beat frequency based on a third resonance frequency for the second counter-propagating direction;
   wherein the second resonance frequency is at least one resonance mode lower than the first resonance frequency and the third resonance frequency is at least one resonance mode higher than the first resonance frequency and the rotational rate of the resonator gyroscope is a function of the first, second and third beat frequencies.

2. The resonator gyroscope of claim 1, wherein the reference laser generator further comprises:
   a relative intensity noise (RIN) servo coupled to an output of the master light source to filter intensity fluctuations in the reference light.

3. The resonator gyroscope of claim 2, wherein the RIN servo comprises:
   a photodetector to convert light intensity to an electrical signal;
   a RIN servo electronics coupled to the photodetector to generate control signals for adjusting the intensity of the reference light; and
   an intensity modulator coupled to the RIN servo electronics to cancel intensity fluctuations in the reference light based on the control signals.

4. The resonator gyroscope of claim 1, wherein the frequency discriminator comprises an optical resonator having a linear portion in its resonance curve and wherein the servo electronics lock the master light source to a frequency in the linear portion of the resonance curve such that frequency fluctuations are converted linearly to intensity fluctuations.

5. The resonator gyroscope of claim 1, further comprising a third slave light source having a third modulation frequency to produce a third slave light having a third frequency;
   a third phase-lock-loop (PLL) to beat the third slave light with the reference light and to drive the third slave light source such that the third slave light is locked to the reference light;
   wherein the resonator circulates a third circulating light through the optical fiber coil in the second counter-propagating direction, the third circulating light based on a portion of the third slave light.

6. The resonator gyroscope of claim 5, further comprising:
   a first relative intensity noise (RIN) servo coupled to an output of the first slave light source to control out intensity fluctuations in the first slave light;

a second RIN servo coupled to an output of the second slave light source to control out intensity fluctuations in the second slave light; and a third RIN servo coupled to an output of the third slave light source to control out intensity fluctuations in the third slave light.

7. The resonator gyroscope of claim 1, wherein the optical fiber coil is a hollow core optical fiber coil.

8. The resonator gyroscope of claim 1, wherein the second slave light source is switched between the second resonance frequency for the second counter-propagating direction and a third resonance frequency for the second counter-propagating direction;

wherein the second and third resonance frequencies are placed symmetrically about the first resonance frequency.

9. A resonator gyroscope comprising:

a plurality of light sources, each having a modulation frequency;

one or more light stabilization loops, each of the one or more light stabilization loops coupled to one of the plurality of light sources and comprising:

a resonator having a linear portion in its resonance curve, the resonator converting frequency fluctuations of the light from the respective one of the plurality of light sources to intensity fluctuations;

a photodetector coupled to an output of the resonator to convert fluctuations in the intensity of an optical output of the resonator to an electrical voltage;

a differential amplifier to compare the output voltage of the photodetector with a stable reference voltage; and servo electronics to provide control signals to the respective one of the plurality of light sources to lock the modulation frequency of the respective light source to a frequency in the linear portion of the resonance curve such that frequency fluctuations are converted linearly to intensity fluctuations, the control signals also driving the respective light source such that frequency fluctuations in the light from the respective light source are removed;

a Sagnac resonator coupled to at least two of the plurality of light sources, the Sagnac resonator having first and second counter-propagating directions and comprising an optical fiber coil, wherein the Sagnac resonator circulates a first circulating light through the optical fiber coil in the first counter-propagating direction, the first circulating light based on a portion of light from one of the at least two light sources; and circulates a second circulating light through the optical fiber coil in a second counter-propagating direction, the second circulating light based on a portion of the light from another of the at least two light sources; and resonance tracking electronics coupled to the Sagnac resonator to generate a first beat frequency based on a first resonance frequency for the first counter-propagating direction, a second beat frequency based on a second resonance frequency for the second counter-propagating direction, and a third beat frequency based on a third resonance frequency for the second counter-propagating direction;

wherein the second resonance frequency is at least one resonance mode lower than the first resonance frequency and the third resonance frequency is at least one resonance mode higher than the first resonance frequency and the rotational rate of the resonator gyroscope is a function of the first, second and third beat frequencies.

10. The resonator gyroscope of claim 9, wherein the plurality of light sources comprises a first light source having a first modulation frequency, a second light source having a second modulation frequency, and a third light source having a third modulation frequency, wherein the first light source frequency is tuned to the first resonance frequency via a first phase-lock loop (PLL), the second light source frequency is tuned to the second resonance frequency via a second PLL, and the third light source frequency is tuned to the third resonance frequency via a third PLL.

11. The resonator gyroscope of claim 10, wherein the one or more light stabilization loops comprises:

a first light stabilization loop coupled to the first light source;

a second light stabilization loop coupled to the second light source; and a third light stabilization loop coupled to the third light source.

12. The resonator gyroscope of claim 10, wherein the plurality of light sources includes a master light source to produce a reference light, wherein the one or more light stabilization loops comprises a single light stabilization loop coupled to the master light source, wherein light from each of the first light source, the second light source, and the third light source is locked to the reference light via the first PLL, the second PLL, and the third PLL, respectively.

13. The resonator gyroscope of claim 9, wherein the plurality of light sources comprises a first light source having a first modulation frequency, and a second light source having a second modulation frequency;

wherein the first modulation frequency is tuned to the first resonance frequency via a first phase-lock loop (PLL), and the second modulation frequency is switched between the second resonance frequency and the third resonance frequency via a second PLL.

14. The resonator gyroscope of claim 9, wherein the one or more light stabilization loops each further comprise a relative intensity noise (RIN) filter to filter intensity fluctuations in the respective light coupled to the one or more light stabilization loops.

15. The resonator gyroscope of claim 14, wherein the RIN filter comprises:

a photodetector to convert light intensity to an electrical signal;

a RIN servo coupled to the photodetector to generate control signals for adjusting the intensity of the reference light; and an intensity modulator coupled to the RIN servo to cancel intensity fluctuations in the reference light based on the control signals.

16. A method of determining a rotational rate of a resonator gyroscope, the method comprising:

generating a plurality of laser beams;

locking each of the plurality of laser beams to a frequency of a linear portion of a resonance curve of a reference resonator to remove frequency fluctuations from each of the plurality of laser beams;

providing one of the plurality of laser beams to a Sagnac resonator in a first counter-propagating direction;

providing at least one of the plurality of lasers to the Sagnac resonator in a second counter-propagating direction;

determining a first beat frequency based on a first resonance frequency for the first counter-propagating direction;

determining a second beat frequency based on a second resonance frequency for the second counter-propagating direction, the second resonance frequency at least one resonance mode lower than the first resonance frequency; and determining a third beat frequency based on a third resonance frequency for the second counter-propagating direction, the third resonance frequency at least one resonance mode higher than the first resonance frequency;

wherein the rotational rate of the resonator gyroscope is a function of the first, second and third beat frequencies.

17. The method of claim 16, wherein providing at least one of the plurality of lasers to the Sagnac resonator in the second counter-propagating direction comprises:

providing a second laser beam tuned to the second resonance frequency to the Sagnac resonator in the second counter-propagating direction and providing a third laser beam tuned to the third resonance frequency to the Sagnac resonator in the second counter-propagating direction.

18. The method of claim 16, further comprising:

passing one or more of the plurality of laser beams through a relative intensity noise (RIN) servo to control out intensity fluctuations in the one or more laser beams of the plurality of laser beams.

19. The method of claim 16, wherein locking each of the plurality of laser beams to a frequency of a linear portion of the resonance curve of the reference resonator comprises locking a first laser beam of the plurality of laser beams directly to a frequency of a linear portion of the resonance curve of the reference resonator; and locking the other laser beams of the plurality of laser beams to the first laser beam.

20. The method of claim 16, wherein providing at least one of the plurality of laser beam to the Sagnac resonator in the second counter-propagating direction includes:

switching the at least one laser beam between the second resonance frequency and the third resonance frequency.

* * * * *